United States Patent
Tailliet (10) Patent No.: US 8,874,816 B2
(45) Date of Patent: Oct. 28, 2014

(54) RESOLVING ADDRESS CONFLICTS FOR MASTER-SLAVE COMMUNICATIONS OVER A SINGLE-WIRE BUS BETWEEN A MASTER CIRCUIT AND AT LEAST TWO SLAVE CIRCUITS

(75) Inventor: François Tailliet, Fuveau (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 99 days.

(21) Appl. No.: 13/243,385

(22) Filed: Sep. 23, 2011

(65) Prior Publication Data

US 2012/0102248 A1    Apr. 26, 2012

(30) Foreign Application Priority Data

Sep. 27, 2010    (FR) ...................................... 10 57754

(51) Int. Cl.
*G06F 13/00* (2006.01)
*G06F 13/42* (2006.01)
*G06F 13/364* (2006.01)

(52) U.S. Cl.
CPC .......... *G06F 13/4295* (2013.01); *G06F 13/364* (2013.01)
USPC ....................................................... 710/110

(58) Field of Classification Search
USPC .................. 710/8–19, 104–110, 306–311
See application file for complete search history.

(56) References Cited

U.S. PATENT DOCUMENTS

| | | | | |
|---|---|---|---|---|
| 5,404,460 | A * | 4/1995 | Thomsen et al. ................. | 710/9 |
| 6,799,235 | B2 * | 9/2004 | Bormann et al. ............. | 710/110 |
| 6,912,606 | B2 * | 6/2005 | Fay ................................ | 710/64 |
| 6,928,501 | B2 * | 8/2005 | Andreas et al. ............... | 710/110 |
| 7,065,593 | B2 * | 6/2006 | Ripy et al. ..................... | 710/100 |
| 7,099,970 | B1 * | 8/2006 | Foegelle et al. ............... | 710/110 |
| 7,565,470 | B2 * | 7/2009 | Lin ................................ | 710/110 |
| 7,631,110 | B2 * | 12/2009 | Berenbaum et al. ............. | 710/9 |
| 7,650,449 | B2 * | 1/2010 | Lu ................................. | 710/106 |
| 7,707,339 | B2 * | 4/2010 | Pigott et al. ................... | 710/110 |
| 8,205,017 | B2 * | 6/2012 | Parr et al. .......................... | 710/9 |
| 2002/0035658 | A1 * | 3/2002 | Whetsel ........................ | 710/300 |
| 2008/0091862 | A1 * | 4/2008 | Hiraka ........................... | 710/110 |

FOREIGN PATENT DOCUMENTS

JP    60 182245 A    9/1985

OTHER PUBLICATIONS

French Search Report dated May 12, 2011 from corresponding French Application No. 10/57754.
Written Opinion dated May 23, 2011 from corresponding French Application No. 10/57754.
Anonymous; The I2C-Bus Specification, Philips Semiconductors, [Online] Verson 2.1, Jan. 1, 2000, pp. 1-46 XP002590803.

* cited by examiner

*Primary Examiner* — Raymond Phan
(74) *Attorney, Agent, or Firm* — Seed IP Law Group PLLC (57) ABSTRACT

A method of transmission over a serial bus, between a master circuit and two slave circuits, wherein each slave circuit makes the transmission of a first one of two binary states depend on the absence of a transmission of the second binary state by the other slave circuit.

33 Claims, 5 Drawing Sheets

RESOLVING ADDRESS CONFLICTS FOR MASTER-SLAVE COMMUNICATIONS OVER A SINGLE-WIRE BUS BETWEEN A MASTER CIRCUIT AND AT LEAST TWO SLAVE CIRCUITS

CROSS REFERENCE TO RELATED APPLICATIONS

This application claims the priority benefit of French patent application Ser. No. 10/57754, filed on Sep. 27, 2010, entitled "MASTER-SLAVE COMMUNICATION OVER A SINGLE-WIRE BUS BETWEEN A MASTER CIRCUIT AND AT LEAST TWO SLAVE CIRCUIT," which is hereby incorporated by reference to the maximum extent allowable by law.

BACKGROUND OF THE INVENTION

1. Field of the Invention

The present invention generally relates to electronic circuits and, more specifically, to the transmission of digital data in a master-slave system. The present invention more specifically applies to communications over a so-called open-drain or open-collector bus (according to the MOS or bipolar technology) and according to a protocol where the transmission speed depends on the states of the transmitted bits.

The present invention for example applies to transmissions over a single-wire bus conveying both data and a synchronization signal.

2. Discussion of the Related Art

In an open-drain (or open-collector) bus, the data conductor of the bus is, in the quiescent state, at a voltage different from ground (generally, a positive voltage). The data are coded and then transmitted by pulling of the bus to ground according to a pre-established coding enabling the receiver to decode the data.

Many communication protocols using an open-drain (or open-collector) bus are known. Be they protocols over a single-wire bus (for example, a protocol known as SWP) or over a multi-wire bus (for example, I2C-type twin-wire protocols), when several slave circuits are connected to a same bus and are capable of communicating with a same master circuit, the master circuit should send over the bus an address or an identifier of the slave circuit enabling it to recognize itself and to respond. The other slave circuits which do not recognize themselves with the address remain silent.

In usual systems, it is thus necessary for the master circuit to know the addresses of the different slave circuits, short of which several slave circuits may respond at the same time, which makes the transmission impossible to be interpreted.

In a single-wire bus protocol, a single communication conductor (in addition to a common reference or ground) is used. The signal transmitted over this bus is used both as a synchronization and data signal (and possibly as a power supply bus for the receiver).

A limitation of such a protocol is that it generally uses a single channel.

SUMMARY OF THE INVENTION

An embodiment overcomes all or part of the disadvantages of known systems of communication over an open-drain (or open-collector) bus.

Another embodiment enables slave circuits to identify themselves for a master circuit.

Another embodiment provides a solution more specifically intended for communication protocols in which bits are transmitted over periods having a duration depending on the bit state.

Another embodiment provides a solution enabling a simultaneous communication between a master circuit and two slave circuits.

Another embodiment provides a dual-channel protocol over a single-wire bus.

An embodiment provides a method of transmission over a serial bus, between a master circuit and two slave circuits, wherein each slave circuit makes the transmission of a first one of two binary states depend on the absence of a transmission of the second binary state by the other slave circuit.

According to an embodiment, the two binary states are coded by durations between two pulses for forcing the bus to a level different from its idle level.

According to an embodiment, a communication is initialized by the following steps:

the two slave circuits simultaneously transmit bits having identical states of identifiers associated therewith, a single one of the slave circuits transmitting the bits having a different state than the identifier of the other slave circuit;

the two slave circuits simultaneously transmit bits having identical states of inverses of these identifiers associated therewith, a single one of the slave circuits transmitting bits having a different state than the inverse of identifier of the other slave circuit; and each slave circuit exploits the combinations present on the bus to determine an order of communication between the two circuits.

According to an embodiment, the master circuit triggers the previous steps by the sending of a specific control signal over the bus.

According to an embodiment, said control signal is preceded by the sending, by the master circuit, of an address common to the two slave circuits.

According to an embodiment, each slave circuit determines a relation between its own identifier and that of the other slave circuit.

According to an embodiment, the relation between identifiers is an order relation.

According to an embodiment, each slave circuit transmits to the master circuit an address concerning it, the transmission order being set by the relation between the respective identifiers of the slave circuits.

According to an embodiment, each slave circuit transmits to the master circuit its identifier as an address.

An embodiment provides an electronic circuit of transmission over a serial bus.

An embodiment provides a master-slave transmission system between a master and two slaves.

The foregoing and other objects, features, and advantages will be discussed in detail in the following non-limiting description of specific embodiments in connection with the accompanying drawings.

DETAILED DESCRIPTION

The same elements have been designated with the same reference numerals in the different drawings. For clarity, only those steps and elements which are useful to the understanding of the discussed embodiments will be described. In particular, what use is made of the data in each of the communicating circuits has not been detailed, the described embodiments being compatible with current uses of such data. Further, the coding of the signals to be transmitted by the different communicating circuits has not been detailed either, the present invention being here again compatible with usual circuits for coding such signals.

Figure 1:
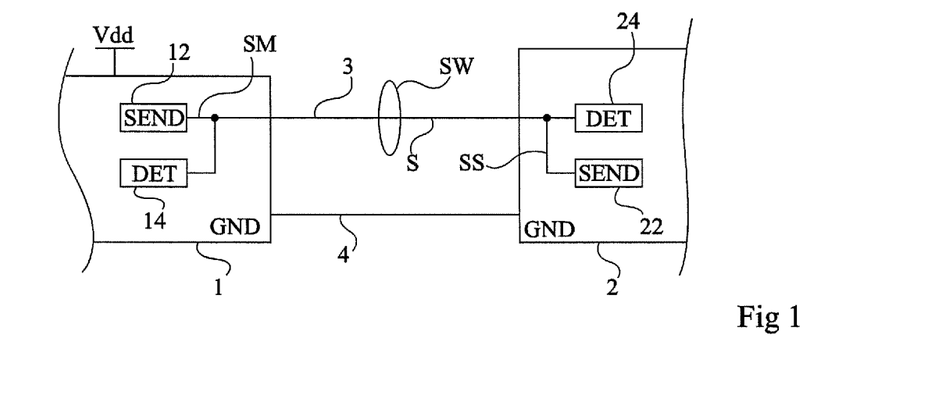
FIG. 1 partially shows in the form of blocks two circuits capable of communicating according to a master-slave protocol over a single-wire bus.

FIG. 1 is a partial block diagram of an embodiment of a single-wire bus communication system. In the example of FIG. 1, a circuit 1, arbitrarily considered as a master circuit, is capable of communicating according to a single-wire protocol SW with a distant circuit 2. Circuits 1 and 2 are connected by a wire 3 forming the single-wire bus and share the same reference voltage (connection 4—ground GND).

Each circuit 1, 2 for example comprises a transmit circuit (SEND) 12, respectively 22, and a receive circuit (DET) 14, respectively 24. For a communication from circuit 1 to circuit 2, circuit 1 imposes a signal SM on the bus. For a communication from circuit 2 to circuit 1, circuit 2 imposes a signal SS on the bus. The circuit which causes the transmission imposes the clock on the bus. For simplification, signals SM and SS have been schematized in FIG. 1 as respectively originating from circuits 12 and 22 and it is considered that circuits 14 and 24 only see the state of the signal S present on the bus. Further, circuits 1 and 2 comprise other elements, especially for exploiting the transmitted signals. Independently from the communication, master circuit 1 generally powers slave circuit 2 as illustrated in FIG. 1 where only the master circuit receives a power supply voltage Vdd. Slave circuit 2 draws its power supply from a regulation of signal S having its idle level, generally imposed by circuit 1, at a high level VH.

In the idle state, wire 3 of the bus is at the high level. This characterizes a so-called open-drain (or open-collector) bus, where the bus is pulled to the power supply voltage and is then forced to a lower state (in this example, the ground) by the different communicating devices. The communication protocol sets different additional conditions in the transmission, according to whether it concerns an address, data, a writing into or a reading from the slave circuit, etc. In particular, an address is generally provided when several slave circuits are capable of being connected to the same bus. The transmission rate is set by a clock signal at the rate of which the transmitter circuit modulates the amplitude of the signal present over the bus. The idle level of the bus however remains set by the master circuit.

This system operates properly, provided for the master circuit to be capable of addressing a single slave circuit at a given time. Indeed, if it is not, two slave circuits consider themselves as addressed, which generates a conflict on the bus.

Now, in certain applications, slave circuits are capable of being connected to the bus while the master circuit does not know their address.

An example of application relates to the case of electronic devices in which two slave circuits are capable of being connected to a same serial bus and should be accessible by a master circuit. Such is the case, for example, for a system in which several batteries for powering an electronic device are capable of being connected to a same bus for authentication.

The present invention will be described hereafter by more specifically referring to a single-wire bus. It should however be noted that it more generally applies to any communication between a master circuit and several slave circuits over a serial bus of open-drain (or open-collector) type, wherein the period of transmission of a bit is different according to the state of this bit.

Figure 2:
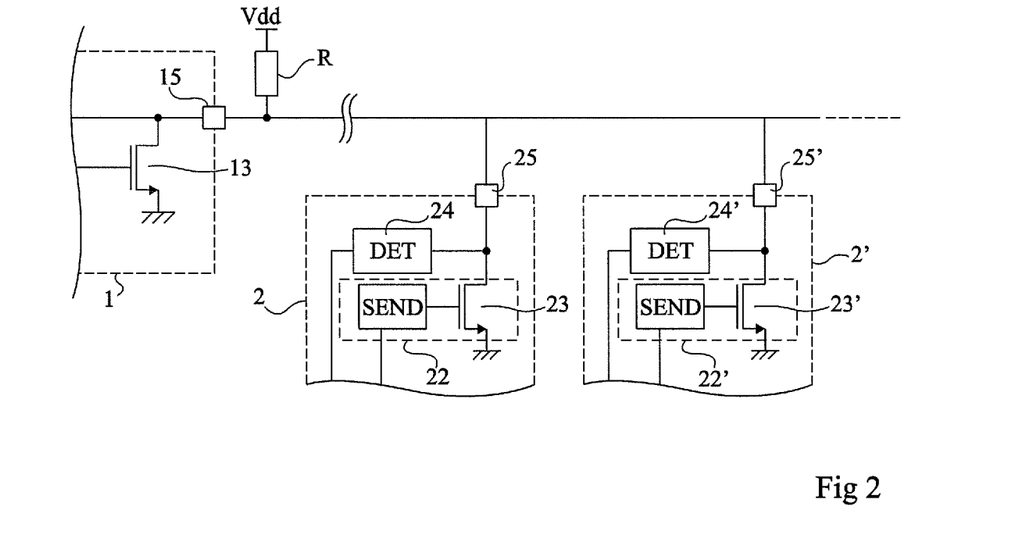
FIG. 2 is a partial block diagram of a master-slave communication system according to an embodiment.

FIG. 2 schematically and partially shows a single-wire serial bus 3 and its connections to a master circuit 1 and to two slave circuits 2 and 2'. Each circuit 1, 2, 2' comprises a switch 13, 23, or 23' grounding a terminal, respectively 15, 25 or 25', intended to be connected to bus 3. Further, as already mentioned, conductor 3 is, in the idle state, pulled to voltage Vdd, for example, by a resistive element R. In practice, switches 13, 23, and 23' are most often made in the form of N-channel MOS transistors, which is the reason why reference is made to an open-drain (or open-collector) serial bus. Switch 13 of master circuit 1 is controlled by its transmission circuit 12 (not shown in FIG. 2). Switches 23 and 23' of circuits 2 and 2' are respectively controlled by transmission circuits 22 and 22' (SEND). As already illustrated in relation with FIG. 1, terminals 25 and 25' are further connected to the input of detectors 24 and 24' (DET) enabling each slave circuit to decode the signals present on the bus. The representation of FIG. 2 is partial and other circuits, in particular for processing transmitted data and data to be transmitted, equip the master and slave devices.

Figure 3:
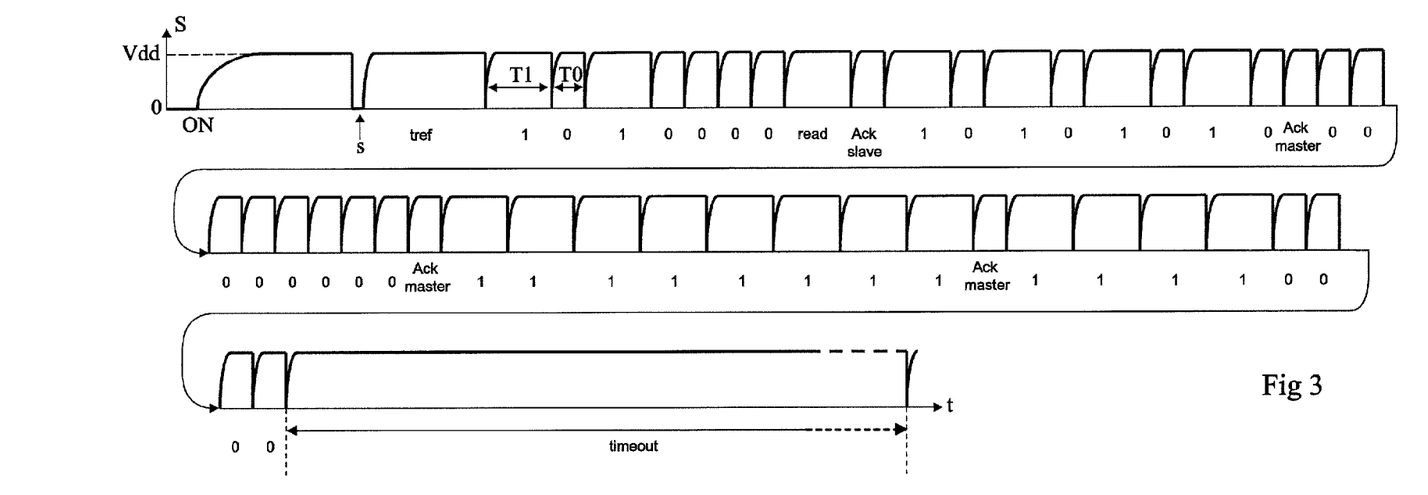
FIG. 3 is a timing diagram illustrating a communication protocol of the type to which the embodiment of FIG. 2 applies.

FIG. 3 is a timing diagram illustrating the operation of an open-drain (or open-collector) single-wire bus, in which the communication speed depends on the respective states of the transmitted bits. This drawing shows the signals over the bus during a communication frame.

As soon as the master circuit is turned on, said circuit powers the bus (time ON) to a high level (close to power supply voltage Vdd). The transmission is carried out by switching the bus to the low level (turning-on of switches 13, 23, 23'), preferably for short time periods. The selection of short time periods according to this protocol aims at preserving the power supply of the slave circuits without requiring capacitive elements having too high a value on the side of said slave circuits.

When the master circuit intends to initiate a transmission, it sets the bus to the low level to warn (wake up) the slave circuit connected to the bus. The start pulse (S) is followed by a platform at the high level which ends at the next low-level pulse. This platform indicates a reference duration (tref) which enables the slave circuit to parameterize a counter that it contains and the respective durations representative of the transmissions of 0s and 1s which will follow. The transmission of a bit at state 1 corresponds to maintaining the bus in the high state for a first time period T1 between two pulses in the low state. The transmission of a state 0 corresponds to maintaining the bus in the high state for a different time period T0

(shorter in the example of FIG. 3). The first byte generally comprises seven address bits of the slave circuit that the master circuit desires to address, followed by an instruction bit translating, for example, when it is at state 1, a request for reading data from the slave circuit. At the end of each byte, the master circuit deallocates the bus, which enables the slave circuits to send an acknowledgement (Ack slave) by the transmission of a bit representing a state 0. The end of a transmission is detected by the absence of a high-level pulse for a time period (timeout) longer than the reference duration. In the example of FIG. 3 where the slave transmits data to the master circuit, the master circuit sends an acknowledgement (Ack master) at each end of a received byte.

To be able to communicate with the two slave circuits, master circuit 1 needs to identify them to address them the relevant frames.

In the embodiment of FIG. 2, the two slave circuits 2 and 2' are assumed to share the same address and are thus not individually identifiable by the master circuit when they are connected to the bus. For example, they are two different batteries which need to be authenticated by the master circuit. They may also be other consumables of ink cartridge type connected to a same bus. More generally, this embodiment applies as soon as two slave circuits are capable of being connected to the bus by being addressed by means of a same address by the master circuit.

In a simplified embodiment where two slave circuits only are connected to the bus, this amounts to being able to connect, to this bus, two slave circuits with no address.

FIGS. 4A, 4B, 4C, and 4D are timing diagrams illustrating what would occur by simultaneously addressing two slave circuits with a same master circuit in the system of FIG. 2. To simplify the representation of FIG. 4A to 4D, an alternative protocol according to which the acknowledgement is not present has been assumed. This changes nothing to the operation which is about to be described. If present, the acknowledgement is simply interposed in the transmission.

Figure 4A:
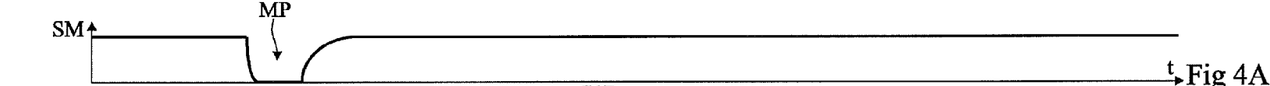
FIGS. 4A, 4B, 4C, and 4D are timing diagrams enlarged with respect to FIG. 3, illustrating an attempt of communication between several slaves and a same master in the system of FIG. 2 with the protocol of FIG. 3.

FIG. 4A is an example of the shape of signal SM showing the last low-level pulse MP of a sending by the master (for example, the last bit of a byte).

Figure 4B:
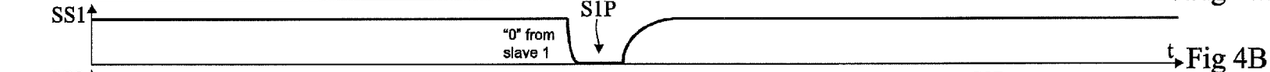

FIG. 4B illustrates an example of a response SS1 of the first slave circuit, assuming the transmission of a 0 (pulse S1P—"0" from slave 1).

Figure 4C:
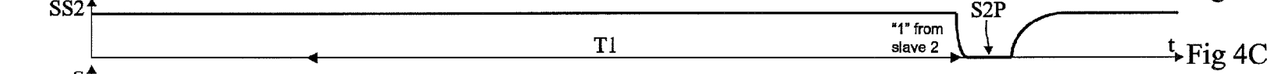

FIG. 4C illustrates an example of a simultaneous response SS2 of the first slave circuit, assuming the transmission of a 1 (pulse S2P—"1" from slave 2).

Figure 4D:
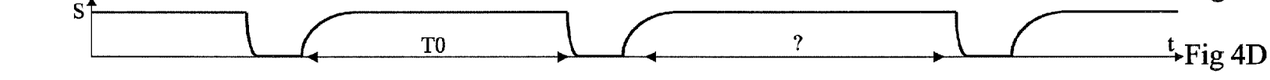

FIG. 4D illustrates the result obtained on the bus (signal S) and shows that the time interval between the two pulses S1P and S2P results in an interpretation error of the master circuit. Only when the two slave circuits respond with identical messages can these be properly decoded by the master circuit. According to the length of the time lag between a bit at state 1 and a bit at state 0, this can either completely alter the synchronization, or let believe to the master circuit that two successive 0s have been transmitted, but in all cases, the detection is altered.

FIGS. 5A, 5B, 5C, and 5D are timing diagrams illustrating a first embodiment of a method for sharing a single-wire bus. These drawings show examples of the respective shapes of signal SM, of signals SS1 and SS2, and of the resulting signal S on the bus. As in the case of FIGS. 4A to 4D, a last pulse MP (Last pulse from master), followed by a beginning of communication by the slave circuits, is assumed, and the possible acknowledgements have not been shown.

According to this embodiment, each slave circuit monitors the bus before forcing it by a pulse originating from its control circuit. If one of the slave circuits sends a 0 on the bus (pulse S1P—"0" from slave 1, FIG. 5B), the circuit sends no pulse if it must transmit a state 1 (Nothing from slave 2, FIG. 5C). On the bus side, this results in a pulse indicative of a 0 only, which is thus interpretable and, especially, which does not disrupt the synchronization.

If the two slave circuits must transmit a 0, they do not have time to detect that the other one has already transmitted one, and both circuits force the bus to 0. However, since it is a simultaneous forcing, this causes no desynchronization and no detection error.

Similarly, if both circuits should transmit a 1, the forcing of the bus, after duration T1, occurs at the same time and respects the protocol.

Figures 5A, 5B:
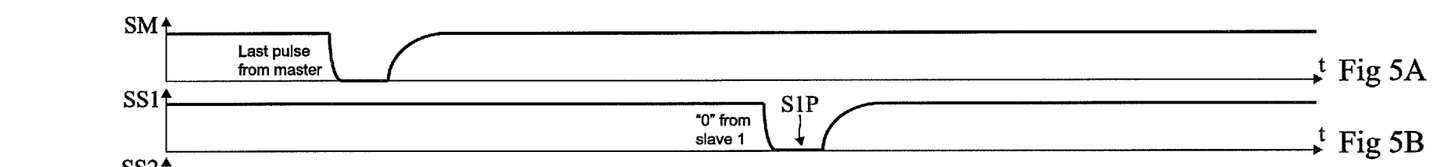
FIGS. 5A, 5B, 5C, and 5D are timing diagrams illustrating a communication between a master circuit and several slave circuits in the system of FIG. 3.
Figure 5C:
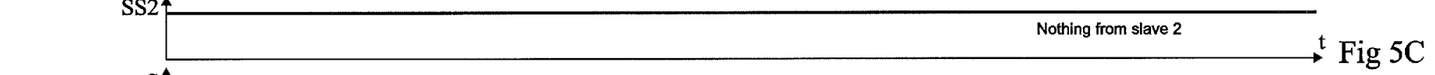
Figure 5D:
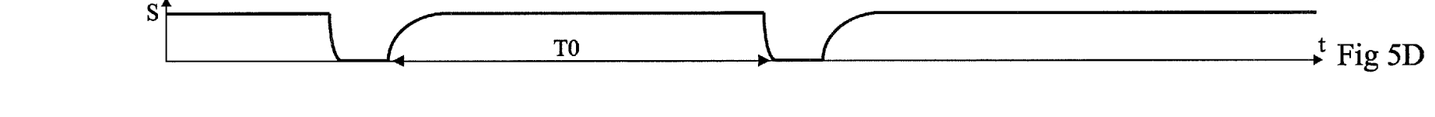

The resulting signal on bus S is not directly interpretable by the master circuit. Indeed, on the one hand, the master circuit does not know from which slave circuit the data originate. On the other hand, if it reads a state 0, it does not know whether the two slave circuits have transmitted the same state. Only if it reads a state 1 does it know that both circuits have transmitted the same state.

To discriminate such an uncertainty, each slave circuit transmits, after a data transmission (for example, after each byte or group of bytes), the same data complemented to 1 (the inverse of the states).

A logic decoding would enable the master circuit to know, by pairs, the successive states of the transmitted bits. However, it remains unable to restore the words since it cannot identify from which slave circuit each bit originates.

Figure 6:
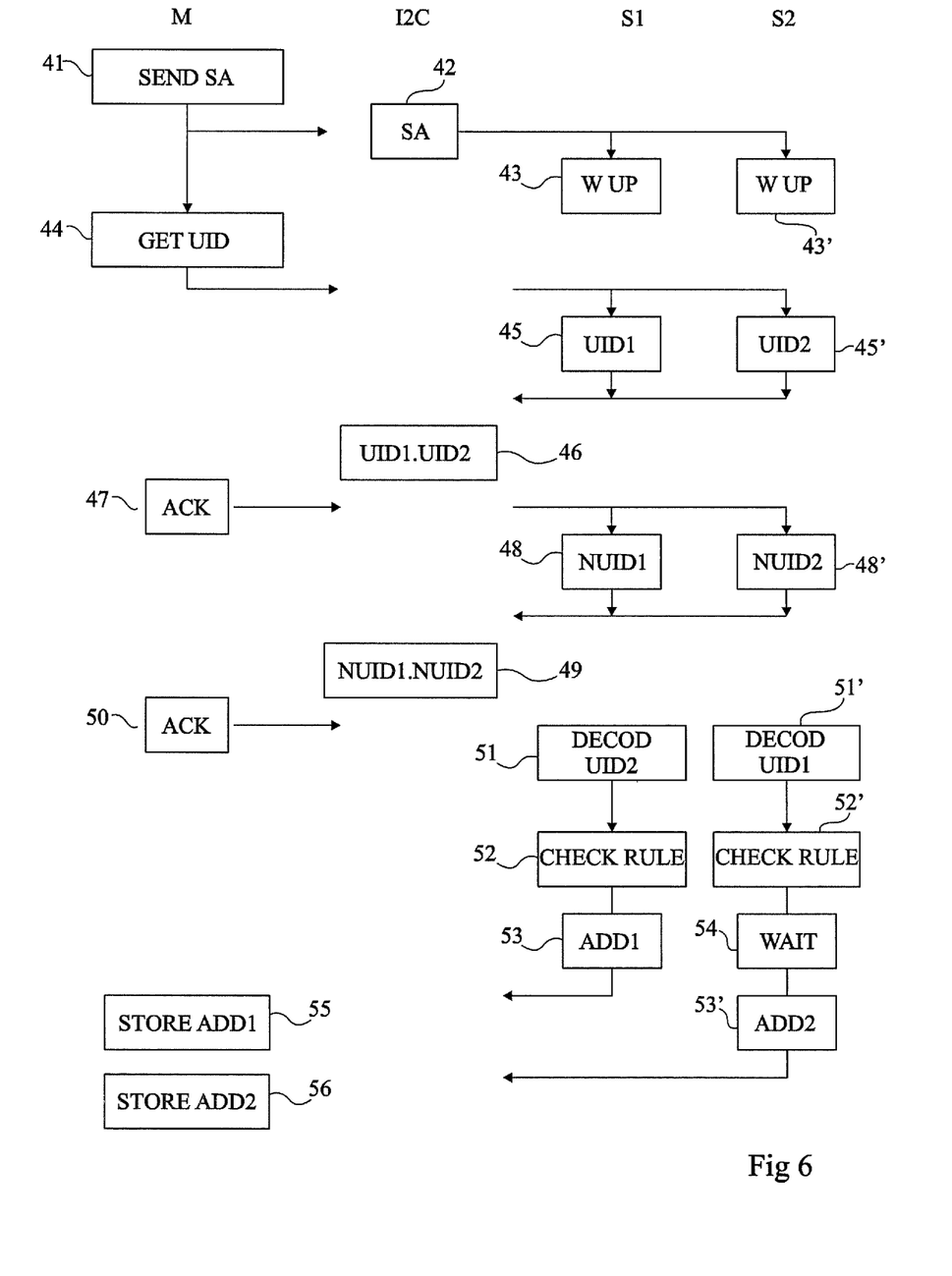
FIG. 6 is a functional block diagram illustrating steps implemented to initiate a communication between a master circuit and several slave circuits in the system of FIG. 3.
Figures 7A, 7B, 7C, 7D:
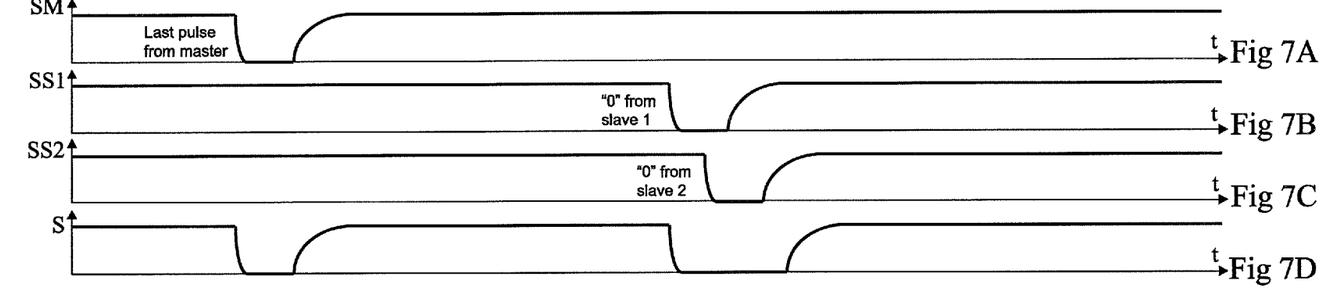
FIGS. 7A, 7B, 7C, and 7D are other timing diagrams illustrating the operation of the transmission system.
Figures 8A, 8B:
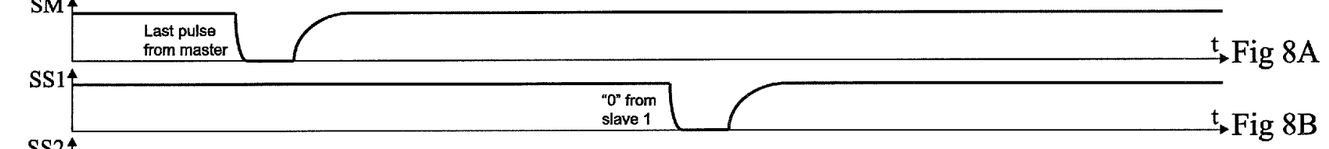
FIGS. 8A, 8B, 8C, and 8D are other timing diagrams illustrating the operation of the transmission system.
Figures 8C, 8D:
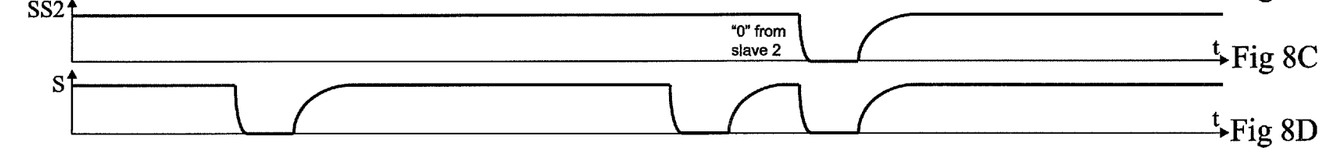

FIG. 6 is a simplified flowchart illustrating a mode of identification, by a master circuit, of two slave circuits sharing the same address.

In a first optional step (block 41, SEND SA), master circuit M sends over the bus the address corresponding to the two slave circuits. This address (block 42, SA) present on the bus is detected by slave circuits S1 and S2, which wakes them up (blocks 43 and 43', WUP) or activates them. In practice, this address may correspond to that of a port of the bus to which one or two slave circuits may be connected.

The master circuit then sends a control signal requesting an identifier (block 44, GET UID).

In the simplified embodiment where only two slaves are connected to the bus, steps 41 and 42 may be omitted and the sending of control signal 44 wakes up the two slave circuits connected to the bus.

Regarding the communication frame, the master circuit initiates, as previously, a communication by means of a start bit S, and then sends the address of the slave. The protocol may here be modified with respect to a process such as described in relation with FIG. 3, since the bit indicative of a request for writing or reading data into and from the slave circuit is not necessary for the identification phase. Preferably, the master circuit waits for an acknowledgement bit even if it is not capable of identifying which of the slave circuits has transmitted it. This at least informs it of the fact that the slave circuits have had time to be activated. The master circuit then sends control signal GET UID and detects a corresponding acknowledgement, here again coming from one or the other of or from both slave circuits.

Each circuit S1, S2 then attempts to send over the bus a single identifier concerning it (block 45, UID1 and block 45', UID2). This identifier is single in that it should enable to distinguish the slave circuit from any other slave circuit capable of being connected to the port accessible with address AD. Such an identifier is for example stored in a non-volatile memory on manufacturing of the slave circuit.

This sending is performed by respecting the rule established in relation with FIGS. 5A to 5D, that is, a state 1 is not transmitted if the other circuit has already transmitted a state 0. Regarding the bus, the sending of the two identifiers translates as an AND-type combination of these identifiers. Indeed, if the current bit of one of the identifiers is at state 1 while the other one is at state 0, the bus sees a 0. If the two bits are at state 0, the bus sees a 0. If the two bits are at state 1, the bus sees a 1. It should be noted that the assignment of a value 0 or 1 to the identifier bit with respect to the high or low voltage is a convention, the combination performed on the bus thus automatically amounting, according to the adopted convention, to a logic AND or OR.

This bit-to-bit combination of the identifiers is of no use for the master circuit. It may however send an acknowledgement bit (block 47, ACK). This enables, if need be, to synchronize the transmission. However, each slave circuit receives combination UID1*UID2 and stores it.

Then, each slave circuit S1 and S2 attempts to send (block 48 and 48'), still according to the same rule, inverse NUID1, respectively NUID2, of its identifier.

This results in a logic NOR-type (or NAND-type, according to the coding) combination of the identifiers on the bus (block 49, NUID1*NUID2).

In the same way as for the transmission of the non-inverted identifiers, the master circuit may send an acknowledgement (block 50, ACK).

Slave circuits 2 and 2' store the combination of the inverted identifiers.

Each slave circuit, knowing its own identifier, the combination of this identifier with the identifiers of the other slave circuit, and the combination of the respective inverses of these identifiers, decodes (block 51, DECOD UID2 and block 51' DECOD UID1) the identifier of the other slave circuit. The master circuit still does not know either of the identifiers. However, each slave circuit knows the identifier of the other one.

It is then possible to implement a rule of determination (blocks 52 and 52', CHECK RULE) of the slave circuit to which a given address is assigned, or more generally a communication order between the two slave circuits.

In the example of FIG. 6, the communication protocol sets a rule according to which the slave circuit having the identifier of smallest value (for example, circuit S1) first transmits its address (block 53, ADD1) to the master circuit. Slave circuit S2 sets to a waiting mode (block 54, WAIT) to transmit its address (block 53', ADD2) to the master circuit. It for example detects the acknowledgement of the first address by the master circuit.

Accordingly, the master circuit successively receives address ADD1, that it stores (block 55, STORE ADD1), and then address ADD2, that it stores (block 56, STORE ADD2). Once this initialization phase has been carried out, the master circuit is capable of sending messages, either to slave circuit S1, or to slave circuit S2.

It will be ascertained that addresses ADD1 and ADD2 are different from each other. For example, a dynamic assignment based on an established convention is provided by taking the order between the UID identifiers into account. The addresses may also be sent by the master circuit and taken into account by the slave circuits according to the established convention.

According to another embodiment, the entire identifier UID1 and UID2 is transmitted to the master circuit. This transmission may be carried out successively, or alternately, one byte out of two, by each slave circuit towards the master circuit.

According to an alternative embodiment, the identifier bytes are successively and alternately sent by each slave. It may also be provided for the acknowledgement bit to be sent by the slave circuits rather than by the master circuit. The latter may, however, verify the individual behavior of each slave circuit by verifying that at the end of each byte transmission, an acknowledgement bit is actually present on the bus.

According to still another example, the address simply corresponds to a bit 0 or 1 since it is sufficient for the master circuit to be capable of distinguishing, at the sending of its frames, whether they are intended for one of the two slave circuits. If other slave circuits are capable of being connected to the bus, this additional bit completes address SA or replaces one bit thereof.

The decoding by each of the slave circuits of the identifier of the other one (blocks 51 and 51') may be performed at the end of the reception of combinations 46 and 49 or, as a variation, progressively if each slave circuit successively transmits a byte of its identifier and the same byte, inverted. In this case, the decoding is faster.

According to another variation, the decoding is stopped as soon as one bit differs in the identifiers transmitted by the slave circuits. This is sufficient to apply a rule setting which of the circuits first sends a response to the master circuit.

It may also be provided to alternate the transmission of the identifiers and of their inverse, bit by bit. The necessary storage space is thus decreased to a minimum.

According to still another variation, no address is transmitted to the master circuit and said circuit only communicates with the two slave circuits in a determined order. The slave circuits having mutually identified themselves, each one is capable, by being applied the shared rule, of knowing whether the communication is or not intended for it.

To avoid a desynchronization of the circuits, especially in the case where the time counters of the slave circuits are not perfectly aligned, the time slot during which the receive circuits take into account a pulse as corresponding to a same state preferably takes into account the maximum tolerances in the time lags between the different counters.

FIGS. 7A, 7B, 7C, and 7D and FIGS. 8A, 8B, 8C, and 8D are timing diagrams illustrating this adaptation of the time slots of the detectors. These drawings are representations of examples of signals similar to those of FIGS. 5A to 5D.

In the example of FIGS. 7A to 7D, the pulses of state 0 of the two slave circuits are slightly offset and overlap.

In the example of FIGS. 8A to 8D, the pulses of state 0 of the two slave circuits are sufficiently offset to be separated.

The slot in which state 0 is taken into account is selected according to the tolerances to be provided for the system.

Preferably, each master or slave circuit restarts or resets its time counter at the end of the last pulse of the detection slot and not after its own pulse generation, to avoid a progressive desynchronization.

Various embodiments have been described, various alterations and modifications will occur to those skilled in the art. In particular, the practical implementation of the present invention is within the abilities of those skilled in the art based on the functional description given hereabove and by using programmable circuits which are usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of transmission over a serial bus, between a master circuit and two slave circuits, wherein each slave circuit makes the transmission of a first one of two binary states depend on the absence of a transmission of the second binary state by the other slave circuit and will not transmit the second binary state if the first binary state is being transmitted.

2. The method of claim 1, wherein the two binary states are coded by durations between two pulses for forcing the bus to a level different from its idle level.

3. The method of claim 1, wherein a communication is initialized by the following steps:
   the two slave circuits simultaneously transmit bits having identical states of identifiers associated therewith, a single one of the slave circuits transmitting the bits having a different state than the identifier of the other slave circuit;
   the two slave circuits simultaneously transmit bits having identical states of inverses of these identifiers associated therewith, a single one of the slave circuits transmitting the bits having a different state than the inverse of the identifier of the other slave circuit; and
   each slave circuit exploits the combinations present on the bus to determine an order of communication between the two circuits.

4. The method of claim 1, wherein each slave circuit determines a relation between its own identifier and that of the other slave circuit.

5. The method of claim 1, wherein each slave circuit transmits to the master circuit an address concerning it, the transmission order being set by the relation between the respective identifiers of the slave circuits.

6. The method of claim 1, wherein each slave circuit transmits to the master circuit its identifier as an address.

7. An electronic circuit of transmission over a serial bus, comprising means capable of implementing the method of claim 1.

8. The method of claim 1, wherein the two slave circuits restart or reset their time counters at the end of a last pulse in a detection slot detected on the serial bus.

9. The method of claim 3, wherein the master circuit triggers the steps of transmitting identifiers and transmitting inverses of the identifiers by the sending of a specific control signal over the bus.

10. The method of claim 3, wherein said control signal is preceded by the sending, by the master circuit, of an address common to the two slave circuits.

11. The method of claim 4, wherein the relation between the identifiers is an order relation.

12. A master-slave transmission system between a master and two slaves, comprising circuits of claim 7.

13. A method for communicating over a serial bus between a master circuit and a first slave circuit, the method comprising:
   receiving, by the first slave circuit, a control signal from the master circuit;
   responsive to receiving the control signal, listening, by the first slave circuit, for a first binary state currently transmitted on the serial bus;
   transmitting, by the first slave circuit, a second binary state if the first binary state has not been transmitted on the serial bus; and
   not transmitting the second binary state if the first binary state has been transmitted on the serial bus.

14. The method of claim 13, further comprising transmitting, by the first slave circuit, the second binary state if the second binary state has been transmitted on the serial bus.

15. The method of claim 13, further comprising transmitting, by the first slave circuit, no signal if the first binary state has been transmitted on the serial bus.

16. The method of claim 13, wherein the first and second binary states are coded by time durations between two pulses on the serial bus that each temporarily force the bus to a level different from its idle level.

17. The method of claim 13, further comprising receiving, by the first slave circuit, an address of the first slave circuit from the master circuit prior to receiving the control signal.

18. The method of claim 13, further comprising:
   transmitting, by the first slave circuit, an identifier code for the first slave circuit;
   recording a first transmitted code;
   transmitting, by the first slave circuit, an inverse of the identifier code for the first slave circuit;
   recording a second transmitted code; and
   determining, by the first slave circuit, a second identifier code for a second slave circuit based upon the first transmitted code, the second transmitted code, and the identifier code for the first slave circuit.

19. The method of claim 13, further comprising restarting or resetting, by the first slave circuit, a time counter at the end of a last pulse in a detection slot detected on the serial bus.

20. The method of claim 18, further comprising determining, by the first slave circuit, an order between the first slave circuit and the second slave circuit for communicating with the master circuit.

21. The method of claim 20, further comprising transmitting, by the first slave circuit and after determining the order, an address of the first slave circuit to the master circuit.

22. The method of claim 20, further comprising transmitting, by the first slave circuit and after determining the order, the identifier of the first slave circuit as an address of the first slave circuit to the master circuit.

23. The method of claim 20, further comprising checking a rule that establishes the order of communication between the first slave circuit and the second slave circuit.

24. A first slave circuit configured to communicate with a master circuit over a serial bus, the first slave circuit comprising:
   a transmit circuit coupled to the serial bus; and
   a receive circuit coupled to the serial bus, wherein the first slave circuit is further configured to:
   receive a control signal from the master circuit;
   listen, using the receive circuit, for a first binary state currently transmitted on the serial bus;
   transmit, using the transmit circuit, a second binary state if the first binary state has not been transmitted on the serial bus; and
   not transmit the second binary state if the first binary state has been transmitted on the serial bus.

25. The first slave circuit of claim 24, wherein the first slave circuit is further configured to transmit the second binary state if the second binary state has been transmitted on the serial bus.

26. The first slave circuit of claim 24, wherein the first slave circuit is further configured to transmit no signal if the first binary state has been transmitted on the serial bus.

27. The first slave circuit of claim 24, wherein the transmit circuit comprises a transistor with a current carrying terminal coupled to the serial bus.

28. The first slave circuit of claim 24, wherein the first slave circuit is configured to:

transmit the first binary state according to a first time duration between two pulses imposed on the serial bus that each temporarily force the bus to a level different from its idle level; and     transmit the second binary state according to a second time duration between two pulses imposed on the serial bus that each temporarily force the bus to a level different from its idle level.

29. The first slave circuit of claim 24, further comprising a time counter, wherein the first slave circuit is further configured to restart or reset the time counter at the end of a last pulse in a detection slot detected on the serial bus.

30. The first slave circuit of claim 24, wherein, responsive to receiving the control signal, the first slave circuit is configured to:

transmit a first identifier code for the first slave circuit;

record a first transmitted code;

transmit an inverse of the first identifier code for the first slave circuit;

record a second transmitted code; and determine a second identifier code for a second slave circuit based upon the first transmitted code, the second transmitted code, and the first identifier code for the first slave circuit.

31. The first slave circuit of claim 30, wherein the first slave circuit is configured to determine an order between the first slave circuit and the second slave circuit for communicating with the master circuit.

32. The first slave circuit of claim 30, wherein the first slave circuit is configured to transmit, after determining the order, an address of the first slave circuit to the master circuit.

33. The first slave circuit of claim 30, wherein the first slave circuit is configured to transmit, after determining the order, the first identifier as an address of the first slave circuit to the master circuit.

\* \* \* \* \*